J. J. DIVEKEY.
BATH TUB FITTING.
APPLICATION FILED FEB. 2, 1914.
1,187,613. Patented June 20, 1916.
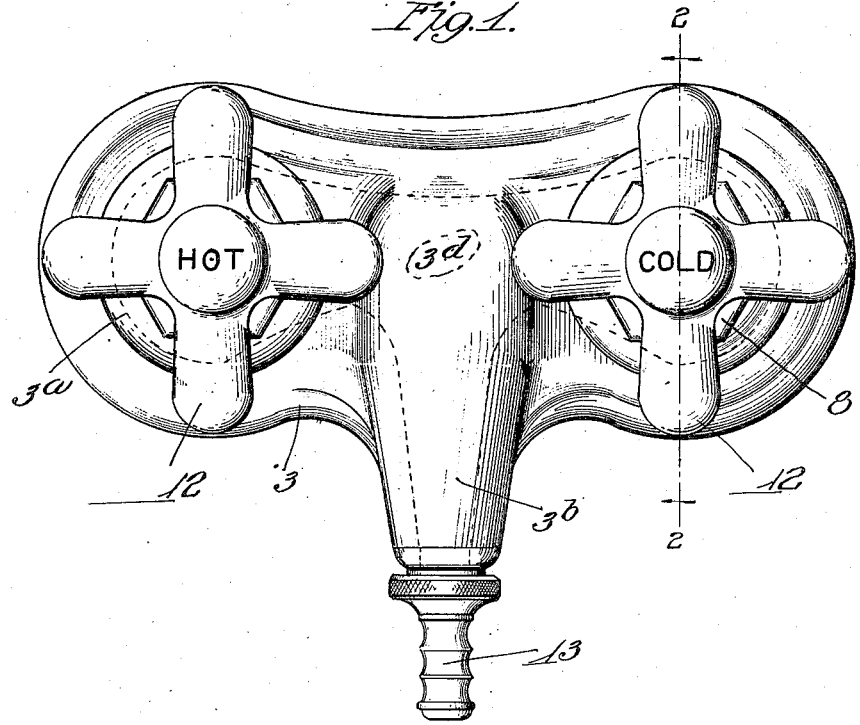
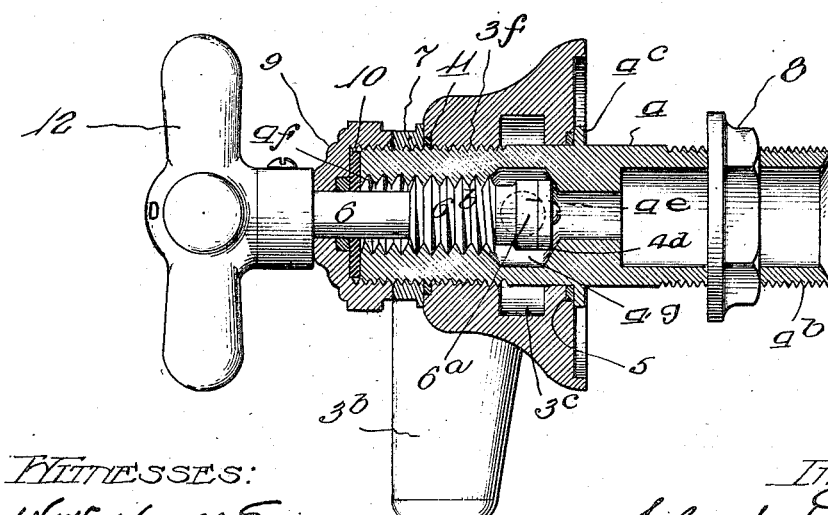

UNITED STATES PATENT OFFICE.

JOHN J. DIVEKEY, OF AURORA, ILLINOIS.

BATH-TUB FITTING.

1,187,613.  Specification of Letters Patent. Patented June 20, 1916.

Application filed February 2, 1914. Serial No. 815,924.

*To all whom it may concern:*

Be it known that I, JOHN J. DIVEKEY, a citizen of the United States, residing at Aurora, in the county of Kane and State of Illinois, have invented certain new and useful Improvements in Bath-Tub Fittings, of which the following is a specification.

My invention relates to improvements in fittings for bath-tubs, wash-bowls and sinks, and the especial object of the improvements hereinafter described is to provide a faucet, the main body of which is adapted to be made of a single casting which may be readily enameled and when so finished, will fit or conform to the adjacent walls of the tub, bowl, &c., so that dirt accumulating crevices will be avoided, and the fitting will harmonize in appearance or finish with the rest of the fixture.

A further object of my invention is to provide a faucet that may be readily connected with the water supply pipes by a simple form of pipe coupling through which a water passage is provided, said passage being controlled by any common form of valve.

A still further object of my improvement is to provide a faucet in which the surfaces incidental to the use of pipes and nuts common to nickeled fixtures are entirely eliminated, thus furnishing a faucet that may be easily cleaned and will be free from accumulations of grease.

An additional object is to provide a faucet that will be cheap to make, easy to install and that may be readily disassembled for repairs or replacement of valves, &c.

In the accompanying drawing:—Figure 1 is a front elevation of my improved fitting; and Fig. 2 is a vertical section taken on line 2—2 of Fig. 1.

My improved faucet consists of a base or body portion 3, having at its ends enlarged forwardly extending bosses $3^a$, and centrally disposed between these bosses a spout or nozzle, $3^b$. All of these portions are integrally cast with the base 3. Extending throughout the base, bosses and nozzle, is a chamber $3^c$, the walls of which are indicated by dotted lines in Fig. 1. The bosses and rear walls are tapped transversely, and internally threaded as at $3^f$, the bores thus provided, intersecting the chamber $3^c$.

To connect the faucet body above described with hot and cold water supply pipes (not shown) I provide couplings, each of which consists of a short length of pipe 4, which is externally threaded at and adjacent its opposite ends as shown at $4^a$, $4^b$, and is formed with an annular shoulder $4^c$. The bore of the pipe is formed with a valve-seat $4^d$ at one end of a chamber $4^g$, and communicating with said chamber are openings $4^e$ which extend laterally through the walls of the pipe, one of said openings being indicated by dotted lines in Fig. 2. The bore of said coupling is internally threaded at its forward portion to provide the female threads $4^f$, which are engaged by the male threads $6^b$ of the valve stem 6. The valve $6^a$ is secured to the inner end of the stem 6, and is adapted to control the passageway to the chamber $4^g$ from the rear bore of the pipe.

The rear face of the base 3 is countersunk as at 5, to receive the shoulder $4^c$, so that the base will fit snugly against the face of the fixture to which it is applied, and a nut 8 is mounted on the threaded portion $4^b$, to serve as a clamping member on the rear side of the fixture. The forward portion of the member 4 is provided with nuts 7 and 9, and with coöperating washers 10 and 11, by which a water-tight joint is effected between the pipe 4, the bosses $3^a$ and the handle 12, the latter being secured to the forward end of the valve-stem 6. The form of valve and coöperating valve seat, and the means for effecting a tight-joint between the members $3^a$, 4 and valve-stem, herein described, are well known elements of faucet construction.

It will be seen that my improvements comprise a one-piece faucet having two inlets, a single outlet and an internal water chamber communicating with said inlets and outlet, and co-extensive with the faucet, and water supply pipe couplings, the latter serving as conduits, as connections between the faucet and the fixture (*i. e.* bath-tub) and affording seats for the valves.

I claim as my invention:—

A faucet comprising a faucet body having a chamber with an outlet leading therefrom and with a passageway extending transversely through both body and chamber, the walls of said passageway forward of said chamber being interiorly threaded; a service pipe extension adapted to extend through said passageway and exteriorly threaded to engage the threads of said passageway; a restriction in the bore of said pipe intermediate the ends thereof, the bore forward of said restriction being enlarged, and at the point of said enlargement having direct communication with the chamber of said faucet body, and forward of said enlargement reduced but still maintained of greater diameter than said restriction and interiorly threaded; a valve adapted to be inserted in the forward portion of the bore of said service pipe extension and adapted to coöperate with a seat formed around one extremity of said restriction; a threaded stem for said valve adapted to engage the threads in the forward portion of the bore of said service pipe extension; and a stuffing box adapted to surround the stem of said valve and having threaded connection with the end of said service pipe extension.

In testimony whereof I affix my signature in the presence of two witnesses.

JOHN J. DIVEKEY.

Witnesses:
 OTTO DIVEKEY,
 HARVEY A. RACKMYER.